US011044530B2

(12) United States Patent
Ogle et al.

(10) Patent No.: US 11,044,530 B2
(45) Date of Patent: \*Jun. 22, 2021

(54) SET-TOP BOX WITH ENHANCED CONTROLS

(71) Applicant: Enseo, Inc., Richardson, TX (US)

(72) Inventors: Vanessa Ogle, Fairview, TX (US); Edward H. Wolfe, Plano, TX (US)

(73) Assignee: Enseo, LLC, Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/293,289

(22) Filed: Mar. 5, 2019

(65) Prior Publication Data

US 2019/0200081 A1   Jun. 27, 2019

Related U.S. Application Data

(63) Continuation of application No. 15/824,887, filed on Nov. 28, 2017, now Pat. No. 10,225,615, which is a
(Continued)

(51) Int. Cl.
*H04N 21/478*   (2011.01)
*H04N 21/214*   (2011.01)
(Continued)

(52) U.S. Cl.
CPC .......... *H04N 21/478* (2013.01); *G08C 17/02* (2013.01); *H04N 5/58* (2013.01); *H04N 21/2143* (2013.01);
(Continued)

(58) Field of Classification Search
CPC .......... H04N 21/478; H04N 21/43637; H04N 21/4131; H04N 21/42203; H04N 21/42224; H04N 21/42221; H04N 21/2143; H04N 21/42202; H04N 21/633; H04N 21/42207; H04N 21/4222; H04N 21/4367; H04N 21/4221; H04N 5/4403; H04N 2005/4407; H04N 2005/4423; H04N 2005/4428; G08C 2201/30; G08C 2201/92; G08C 2201/20; G08C 2201/93; G08C 17/02
See application file for complete search history.

(56) References Cited

U.S. PATENT DOCUMENTS 6,263,503 B1   7/2001   Margulis
6,741,684 B2   5/2004   Kaars
(Continued)

*Primary Examiner* — Oschta I Montoya
(74) *Attorney, Agent, or Firm* — Scott Griggs; Griggs Bergen LLP

(57) ABSTRACT

A set-top box with enhanced content and system and method for use of the same are disclosed. In one embodiment, a wireless transceiver is located within a housing, which also interconnectively includes a television input, television output, a processor, and memory. The set-top box may establish a pairing with a proximate wireless-enabled interactive programmable device having a display. Content, such music, for example, may be imported from the proximate wireless-enabled interactive programmable device and provided to the television. While the music is playing, the set-top box may generate and provide to the television a control signal that includes instructions to adjust the brightness of the television by dimming the television.

14 Claims, 3 Drawing Sheets

Related U.S. Application Data continuation of application No. 15/418,463, filed on Jan. 27, 2017, now Pat. No. 9,832,511, which is a continuation-in-part of application No. 15/162,823, filed on May 24, 2016, now abandoned, which is a continuation of application No. 14/876,571, filed on Oct. 6, 2015, now Pat. No. 9,351,029, which is a continuation of application No. 14/525,392, filed on Oct. 28, 2014, now Pat. No. 9,154,825, which is a continuation of application No. 14/177,876, filed on Feb. 11, 2014, now Pat. No. 8,875,195, which is a continuation of application No. 13/528,663, filed on Jun. 20, 2012, now Pat. No. 8,650,600.

(60) Provisional application No. 61/498,734, filed on Jun. 20, 2011, provisional application No. 62/287,749, filed on Jan. 27, 2016.

(51) Int. Cl.

| | | |
|---|---|---|
| *H04N 21/4363* | (2011.01) | |
| *H04N 21/41* | (2011.01) | |
| *H04N 21/439* | (2011.01) | |
| *H04N 21/436* | (2011.01) | |
| *H04N 21/485* | (2011.01) | |
| *H04W 4/21* | (2018.01) | |
| *G08C 17/02* | (2006.01) | |
| *H04N 21/422* | (2011.01) | |
| *H04N 21/4367* | (2011.01) | |
| *H04N 5/58* | (2006.01) | |
| *H04N 21/4223* | (2011.01) | |
| *H04N 21/442* | (2011.01) | |
| *H04N 21/443* | (2011.01) | |
| *H04N 21/466* | (2011.01) | |

(52) U.S. Cl.
CPC ..... *H04N 21/4126* (2013.01); *H04N 21/4131* (2013.01); *H04N 21/41265* (2020.08); *H04N 21/4222* (2013.01); *H04N 21/4223* (2013.01); *H04N 21/42202* (2013.01); *H04N 21/42208* (2013.01); *H04N 21/42224* (2013.01); *H04N 21/439* (2013.01); *H04N 21/4367* (2013.01); *H04N 21/43615* (2013.01); *H04N 21/43637* (2013.01); *H04N 21/4436* (2013.01); *H04N 21/44218* (2013.01); *H04N 21/466* (2013.01); *H04N 21/4854* (2013.01); *H04W 4/21* (2018.02); *G08C 2201/20* (2013.01); *G08C 2201/30* (2013.01); *G08C 2201/92* (2013.01); *G08C 2201/93* (2013.01); *H04N 21/42204* (2013.01)

(56) References Cited

U.S. PATENT DOCUMENTS

| | | | |
|---|---|---|---|
| 7,109,974 B2 * | 9/2006 | Kempisty | H04N 5/4403 345/173 |
| 8,286,204 B2 | 10/2012 | Fukuda et al. | |
| 8,650,600 B2 | 2/2014 | Ogle et al. | |
| 8,875,195 B2 | 10/2014 | Ogle et al. | |
| 9,154,825 B2 | 10/2015 | Ogle et al. | |
| 9,351,029 B2 | 5/2016 | Ogle et al. | |
| 9,832,511 B2 | 11/2017 | Ogle et al. | |
| 10,225,615 B2 | 3/2019 | Ogle et al. | |
| 2002/0059621 A1 | 5/2002 | Thomas et al. | |
| 2002/0143805 A1 | 10/2002 | Hayes et al. | |
| 2003/0073411 A1 | 4/2003 | Meade | |
| 2005/0005297 A1 | 1/2005 | Lee | |
| 2005/0035846 A1 | 2/2005 | Zigmond et al. | |
| 2005/0097618 A1 * | 5/2005 | Arling | H04L 12/2805 725/114 |
| 2005/0108751 A1 | 5/2005 | Dacosta | |
| 2005/0262535 A1 | 11/2005 | Uchida et al. | |
| 2008/0134256 A1 * | 6/2008 | DaCosta | H04N 7/17318 725/62 |
| 2010/0082485 A1 | 4/2010 | Lin et al. | |
| 2010/0082491 A1 | 4/2010 | Rosenblatt et al. | |
| 2010/0188279 A1 | 7/2010 | Shamilian et al. | |
| 2011/0007018 A1 | 1/2011 | McKinley et al. | |
| 2011/0067059 A1 | 3/2011 | Johnston et al. | |
| 2013/0174204 A1 * | 7/2013 | Coburn, IV | H04L 65/4084 725/81 |
| 2016/0150263 A1 * | 5/2016 | Patino | H04N 21/4182 725/25 |
| 2017/0142473 A1 | 5/2017 | Ogle et al. | |

* cited by examiner

SET-TOP BOX WITH ENHANCED CONTROLS

PRIORITY STATEMENT & CROSS-REFERENCE TO RELATED APPLICATIONS

This application is a continuation of co-pending U.S. patent application Ser. No. 15/824,887 entitled "Set-Top Box with Enhanced Controls" filed on Nov. 28, 2017, in the names of Vanessa Ogle et al., now U.S. Pat. No. 10,225,615 issued on Mar. 5, 2019; which is a continuation of U.S. patent application Ser. No. 15/418,463 entitled "Set-Top Box with Enhanced Controls" filed on Jan. 27, 2017, in the names of Vanessa Ogle et al., now U.S. Pat. No. 9,832,511 issued on Nov. 28, 2017; which claims priority from U.S. Patent Application Ser. No. 62/287,749 entitled "Set-Top Box with Enhanced Controls" filed on Jan. 27, 2016, in the names of Vanessa Ogle and Edward H. Wolfe. U.S. patent application Ser. No. 15/418,463 entitled "Set-Top Box with Enhanced Controls" filed on Jan. 27, 2017, in the names of Vanessa Ogle et al., now U.S. Pat. No. 9,832,511 issued on Nov. 28, 2017, is also a continuation-in-part of U.S. patent application Ser. No. 15/162,823 entitled "Set Top/Back Box, System and Method for Providing a Remote Control Device" filed on May 24, 2016, in the names of Vanessa Ogle et al.; which is a continuation of U.S. patent application Ser. No. 14/876,571 entitled "Set Top/Back Box, System and Method for Providing a Remote Control Device" filed on Oct. 6, 2015, in the names of Vanessa Ogle et al., now U.S. Pat. No. 9,351,029 issued on May 24, 2016; which is a continuation of U.S. patent application Ser. No. 14/525,392 entitled "Set Top/Back Box, System and Method for Providing a Remote Control Device" filed on Oct. 28, 2014, now U.S. Pat. No. 9,154,825 issued on Oct. 6, 2015; which is a continuation of U.S. patent application Ser. No. 14/177,876 entitled "Set Top/Back Box, System and Method for Providing a Remote Control Device" filed on Feb. 11, 2014, in the names of Vanessa Ogle et al., now U.S. Pat. No. 8,875,195 issued on Oct. 28, 2014; which is a continuation of U.S. patent application Ser. No. 13/528,663 entitled "Set Top/Back Box, System And Method For Providing A Remote Control Device" filed on Jun. 20, 2012, in the names of Vanessa Ogle et al., now U.S. Pat. No. 8,650,600 issued on Feb. 11, 2014; which claims priority from U.S. Patent Application Ser. No. 61/498,734 entitled "Set Top/Back Box, System and Method for Providing a Remote Control Device" filed on Jun. 20, 2011, in the names of Vanessa Ogle et al.; all of which are hereby incorporated by reference for all purposes.

TECHNICAL FIELD OF THE INVENTION

This invention relates, in general, to set-top boxes and, in particular, to set-top boxes with enhanced content and control, and systems and methods for use of the same that address and enhance the content and control typically received from an external signal source and provided to a television.

BACKGROUND OF THE INVENTION

Without limiting the scope of the present invention, the background will be described in relation to televisions in the hospitality lodging industry, as an example. To many individuals, a television is more than just a display screen, rather it is a doorway to the world, both real and imaginary, and a way to experience new possibilities and discoveries. Consumers are demanding enhanced content in an easy-to-use platform. As a result of such consumer preferences, the quality of content and ease-of-use are frequent differentiators in determining the experience of guests staying in hospitality lodging establishments. Accordingly, there is a need for improved systems and methods for providing enhanced content in an easy-to-use platform in the hospitality lodging industry.

SUMMARY OF THE INVENTION

It would be advantageous to achieve a set-top box that would improve upon existing limitations in functionality. It would also be desirable to enable a computer-based electronics and software solution that would provide enhanced content and control in an easy-to-use platform in the hospitality lodging industry or in another environment. To better address one or more of these concerns, a set-top box with enhanced content and control and systems and methods for use of the same are disclosed. In one embodiment of the set-top box, a wireless transceiver is located within a housing, which also interconnectively includes a television input, television output, a processor, and memory.

The set-top box may establish a pairing with a proximate wireless-enabled interactive programmable device having a display. Content, such as music, for example, may be imported from the proximate wireless-enabled interactive programmable device and provided to the television. While the music is playing, the set-top box may generate and provide to the television a control signal that includes instructions to adjust the brightness of the television by dimming the television. These and other aspects of the invention will be apparent from and elucidated with reference to the embodiments described hereinafter.

BRIEF DESCRIPTION OF THE DRAWINGS

For a more complete understanding of the features and advantages of the present invention, reference is now made to the detailed description of the invention along with the accompanying figures in which corresponding numerals in the different figures refer to corresponding parts and in which.

DETAILED DESCRIPTION OF THE INVENTION

While the making and using of various embodiments of the present invention are discussed in detail below, it should be appreciated that the present invention provides many applicable inventive concepts, which can be embodied in a wide variety of specific contexts. The specific embodiments discussed herein are merely illustrative of specific ways to make and use the invention, and do not delimit the scope of the present invention.

Figure 1:
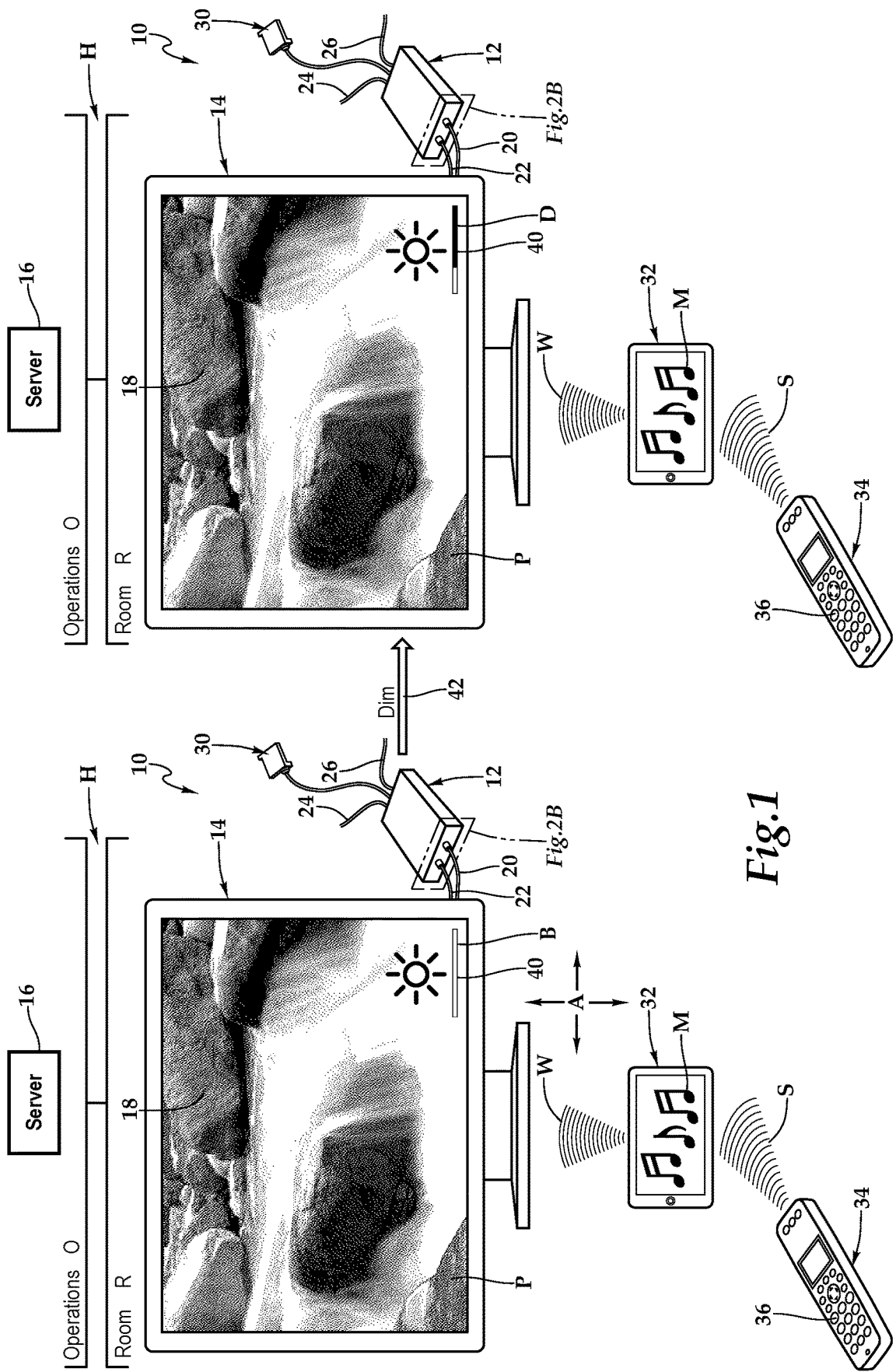
FIG. 1 is a schematic diagram depicting one embodiment of a system for providing a set-top box having enhanced content thereon according to the teachings presented herein.
Figure 2A:
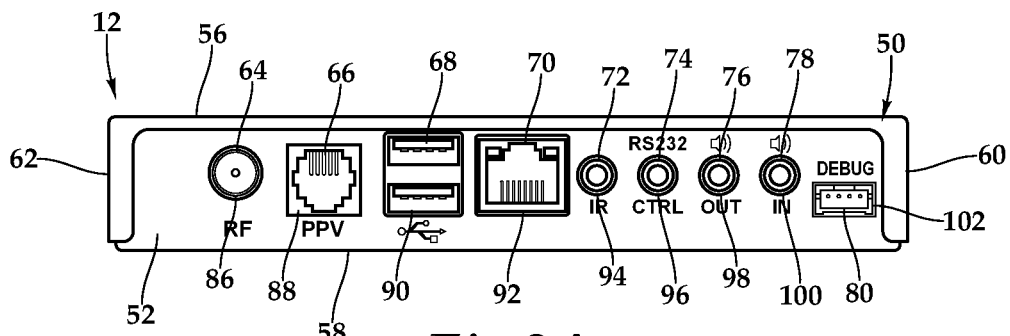
FIG. 2A is a wall-facing exterior elevation view of one embodiment of the set-top box depicted in FIG. 1 in further detail.
Figure 2B:
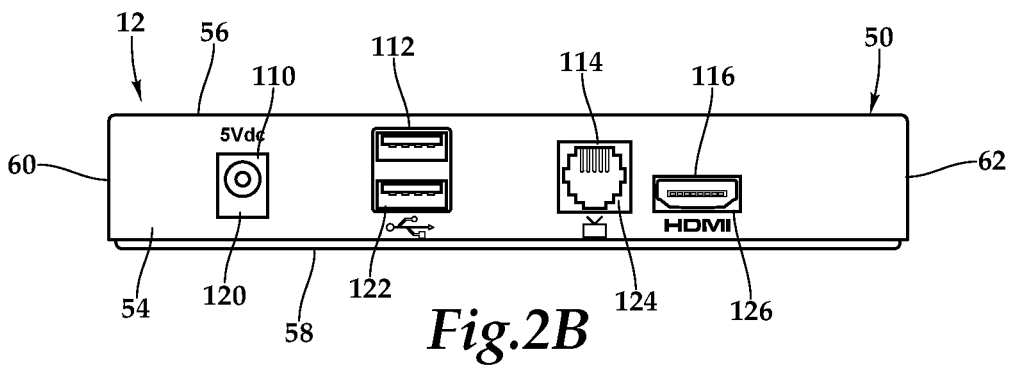
FIG. 2B is a television-facing exterior elevation view of the set-top box depicted in FIG. 2A.
Figure 2C:
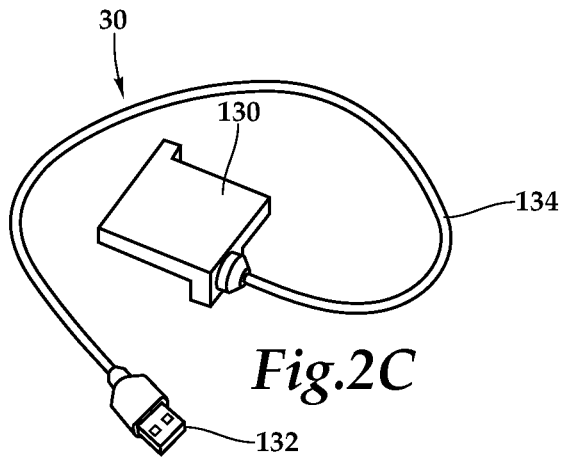
FIG. 2C is a front perspective view of a dongle depicted in FIG. 1 in further detail.
Figure 3:
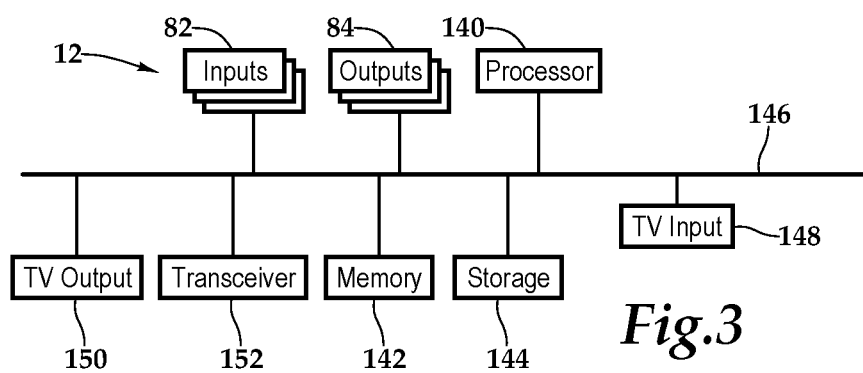
FIG. 3 is a functional block diagram depicting one embodiment of the set-top box presented in FIGS. 2A and 2B.

Referring initially to FIG. 1, therein is depicted one embodiment of a system 10 utilizing a set-top box 12 with enhanced content and control capabilities being employed within a hospitality lodging establishment. The hospitality lodging establishment or, more generally, hospitality property, may be a furnished multi-family residence, dormitory, lodging establishment, hotel, hospital, or other multi-unit environment. As shown, by way of example and not by way of limitation, the hospitality environment is depicted as the hotel H having various rooms, including room R and back of the house operations O. The set-top box 12 is communicatively disposed with various amenities associated with the hospitality environment or hotel H, including a television 14. Set-top boxes, like the set-top box 12, may be deployed throughout the rooms R of the hotel H and are in communication with a property server 16, which is co-located at the hotel H.

As shown, in one embodiment, within the room R, the system 10 includes the set-top box 12 and a display illustrated as the television 14 having a screen 18. A connection, which is depicted as an HDMI connection 20, connects the set-top box 12 to the television 14. Other connections include a power cable 22 coupling the set-top box 12 to a power source, a coaxial cable 24 coupling the set-top box 12 to an external cable source, and a category five (Cat 5) cable 26 coupling the set-top box 12 to an external pay-per-view source at a hotel or other lodging establishment, for example. As shown, the set-top box 12 may include a dongle 30 providing particular technology and functionality extensions thereto. That is, the set-top box 12 may be set-top box-dongle combination in one embodiment. More generally, it should be appreciated that the cabling connected to the set-top box 12 will depend on the environment and application and the cabling connections presented in FIG. 1 are depicted for illustrative purposes. Further, it should appreciated that the positioning of the set-top box 12 will vary depending on environment and application and, with certain functionality, the set-top box 12 may be placed more discretely behind the television 14.

A proximate wireless-enabled interactive programmable device 32 may be a wireless-enabled interactive handheld device that may be supplied or carried by the guest and may be selected from a range of existing devices, such as, for example iPads®, iPhones®, iPod Touch®, Android® devices, Blackberry® devices, personal computers, laptops, tablet computers, smart phones, and smart watches, for example. As will be discussed in further detail below, in one implementation, an application installed from a server, such as the server 16, enables the set-top box 12 and the proximate wireless-enabled interactive programmable device 32 to be wirelessly paired. In another embodiment, a challenge-response is utilized to wirelessly pair the set-top box 12 and the proximate wireless-enabled interactive programmable device 32. A television remote control 34 includes an array of buttons 36 for adjusting various settings such as television channel and volume. In one embodiment, the television remote control 34 may be a consumer infrared (IR) or other protocol, such as Bluetooth, device configured as a small wireless handheld object that issues commands, as represented by wireless signal S, from a distance to the television 14 in order to control the television 14.

In one implementation, as illustrated, the set-top box 12 extends a physical authorization interface, shown as area A, from the set-top box 12 to an area easily accessible to transitory guest's convenience such as in front or side of the television 14. This physical authorization interface A may include a short range wireless data connection that is enabled only when very close physically to the proximate wireless-enabled interactive programmable device 32, for example. Further, once the pairing is established, the set-top box 12 provides a secure wireless interface to communicate transitory guest user device authorization information to the set-top box 12 to accomplish verification. Once authorization information is communicated to the set-top box 12, the set-top box 12 enables guest configuration and interaction.

In operation, virtual remote control functionality may be provided by the proximate wireless-enabled interactive programmable device 32 to send, using wireless signaling W, a command signal to the television, to import content from the proximate wireless-enabled interactive programmable device 32 to the television 14, or control an amenity associated with a user's stay in a lodging establishment, for example. As shown in FIG. 1, by way of example, a "Sleep Well" mode, which is directed to relaxing, is activated with music M being imported from the proximate wireless-enabled interactive device 32 and played on the television 14. While the music M is playing, relaxing programing P is displayed on the television 14. The relaxing programming P may originate from the set-top box 12, the proximate wireless-enabled programmable interactive device 32 or an outside source, for example. As part of the "Sleep Well" mode, the set-top box 12 may generate and provide to the television 14 a control signal that includes instructions to adjust the brightness of the television by dimming the television. With respect to meter 40, as indicated by arrow 42, the programming P is dimmed from brightness B at the meter 40 to dimness D at the meter 40.

Referring to FIG. 2A, FIG. 2B, FIG. 2C, and FIG. 3, as used herein, set-top boxes, back boxes and set-top/back boxes may be discussed as set-top boxes. By way of example, the set-top box 12 may be a set-top unit that is an information appliance device that generally contains set-top box functionality including having a television-tuner input and displays output through a connection to a display or television set and an external source of signal, turning by way of tuning the source signal into content in a form that can then be displayed on the television screen or other display device. Such set-top boxes are used in cable television, satellite television, and over-the-air television systems, for example.

The set-top box 12 includes a housing 50 having a rear wall 52, front wall 54, top wall 56, bottom base 58, and two sidewalls 60, 62. It should be appreciated that front wall, rear wall, and side wall are relative terms used for descriptive purposes and the orientation and the nomenclature of the walls may vary depending on application. The front wall includes various ports, ports 64, 66, 68, 70, 72, 74, 76, 78, and 80 that provide interfaces for various interfaces, including inputs and outputs. In one implementation, as illustrated, the ports 64 through 80 include inputs 82 and outputs 84 and, more particularly, an RF input 86, a RJ-45 input 88, universal serial bus (USB) input/outputs 90, an Ethernet category 5 (Cat 5) coupling 92, an internal reset 94, an RS232 control 96, an audio out 98, an audio in 100, and a debug/maintenance port 102. The front wall 54 also includes various inputs 82 and outputs 84. More particularly, ports 110, 112, 114, and 116 include a 5V dc power connection 120, USB inputs/outputs 122, an RJ-45 coupling 124, and an HDMI port 126. It should be appreciated that the configuration of ports may vary with the set-top box depending on application and context. As previously alluded to, the housing 50 may include a housing-dongle combination including, with respect to the dongle 30, a unit 130 having a cable 134 with a set-top box connector 132 for selectively coupling with the set-top box 12.

Within the housing 50, a processor 140, memory 142, storage 144, the inputs 82, and the outputs 84 are interconnected by a bus architecture 146 within a mounting architecture. It should be understood that the processor 140, memory 142, storage 144, the inputs 82, and the outputs 84 may be entirely contained within the housing 50 or the housing-dongle combination. The processor 140 may process instructions for execution within the computing device, including instructions stored in the memory 142 or in storage 144. The memory 142 stores information within the computing device. In one implementation, the memory 142 is a volatile memory unit or units. In another implementation, the memory 142 is a non-volatile memory unit or units. Storage 144 provides capacity that is capable of providing mass storage for the set-top box 12. Various inputs 82 and outputs 84 provide connections to and from the computing device, wherein the inputs 82 are the signals or data received by the set-top box 12, and the outputs 84 are the signals or data sent from the set-top box 12.

A television content signal input 148 and a television output 150 are also secured in the housing 50 in order to receive content from a source in the hospitality property and forward the content, including external content such as cable and satellite and pay-per-view (PPV) programing, to the television located within the hotel room.

A transceiver 152 is associated with the set-top box 12 and communicatively disposed with the bus 146. As shown the transceiver 152 may be internal, external, or a combination thereof to the housing 50. Further, the transceiver 152 may be a transmitter/receiver, receiver, or an antenna for example. Communication between various amenities in the hotel room and the set-top box 12 may be enabled by a variety of wireless methodologies employed by the transceiver 152, including 802.11, 3G, 4G, Edge, WiFi, ZigBee, near field communications (NFC), Bluetooth low energy and Bluetooth, for example. Also, infrared (IR) may be utilized.

The memory 142 and storage 144 are accessible to the processor 140 and include processor-executable instructions that, when executed, cause the processor 140 to execute a series of operations. The processor-executable instructions specify a search operation to identify the proximate wireless-enabled interactive programmable device, wherein the search operation utilizes the wireless transceiver to wirelessly identify the proximate wireless-enabled interactive programmable device 32. The processor-executable instructions then establish a pairing between the proximate wireless-enabled interactive programmable device 32 and the set-top box 12. Following the establishment of a pairing, formatted parallel audiovisual experience instructions may be sent to the proximate wireless-enabled interactive programmable device 32. The formatted parallel audiovisual experience instructions are configured to provide a downstream parallel experience related to the content on the television 14. The memory 142 also provides instructions to the processor for virtual buttons on a touch screen display associated with the proximate wireless-enabled interactive programmable device 32. The virtual buttons are associated with the proximate wireless-enabled interactive programmable device 32.

With respect to controlling the television 14, the processor-executable instructions cause the processor to receive and process virtual remote control functionality input instructions from the proximate wireless-enabled interactive programmable device 32. Thereafter, a control signal is generated from the processor-executable instructions utilizing instructions to adjust the brightness of the television. Then, the control signal is sent to the television 14. A configuration profile is associated with the memory 142 and processor-executable instructions that enables the set-top box 12 to control multiple types of televisions, including the television 14.

With respect to importing content from the proximate wireless-enabled interactive programmable device 32, the memory 142 includes processor-executable instructions that, when executed cause the processor 140 to import content from the proximate wireless-enabled interactive programmable device 32 and reformat the imported content such that the television output forwards a fully tuned signal including the imported content to the television 14. The fully tuned signal includes the imported content provides an upstream parallel experience on the television 14 related to the content on the proximate wireless-enabled interactive programmable device 32. The imported content may be audio and/or audio and visual.

Figure 4:
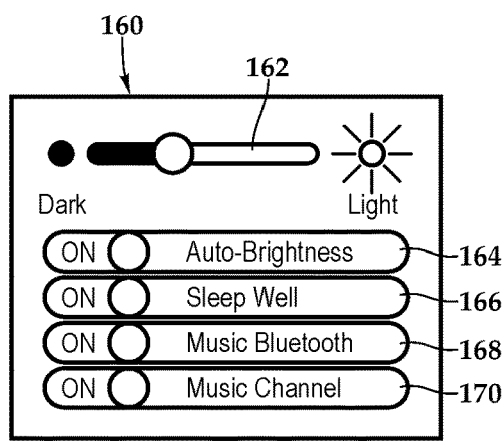
FIG. 4 is a schematic block diagram depicting a brightness menu provided by the set-top box of FIG. 3 as an example of the present disclosure and teachings presented herein.

Referring now to FIG. 4, a brightness menu 160 provided by the set-top box 12 to the proximate wireless-enabled programmable interactive device 32 and/or the television 14. As illustrated, a brightness bar 162 enables manual adjustment of the dimness or brightness by the proximate wireless-enabled interactive programmable device 32 or remote control 34. Further, several different exemplary modes of operation are displayed, including an "Auto-brightness" mode controllable by menu 164, a "Sleep Well" mode controllable by menu 166, a "Music Bluetooth" mode controllable by menu 168, and a "Music Channel" mode controllable by menu 170.

In the "Auto-brightness" mode, the set-top box 12 selects the appropriate brightness based on program type. By way of example and not by way of limitation, a sports program and a movie may have different settings for brightness. In the "Sleep Well" mode, a relaxing programming may be displayed on the television with music with the brightness of the relaxing programming on the television being dimmed. Similarly, in the Music Bluetooth mode, wherein music is streamed from the proximate wireless-enabled programmable interactive device, or in the Music Channel mode, wherein music is provided from an outside source, any imagery on the television is dimmed during the playing of the music.

Figure 5:
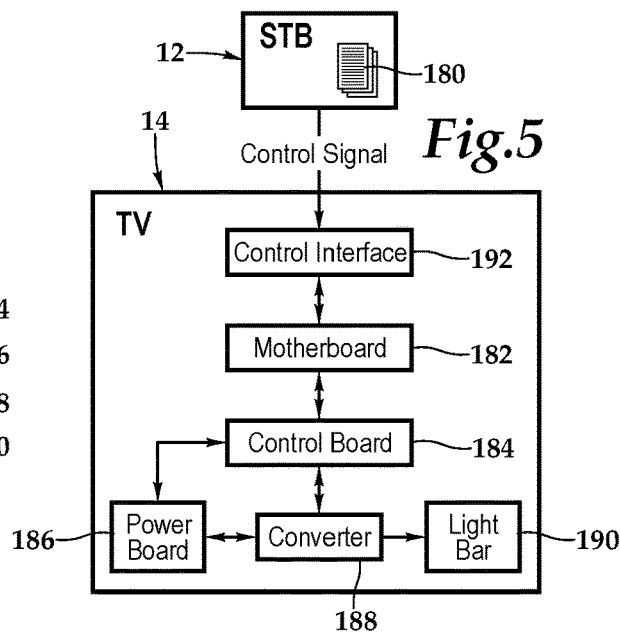
FIG. 5 is a functional block diagram depicting one embodiment of the set-top box of FIG. 3 interacting with a television as an example of the present disclosure and teachings presented herein.

Referring to FIG. 5, the present disclosure provides a television dimming system and a television dimming method enabled by the set-top box 12. As shown, the set-top box 12 includes a configuration profile 180 that, as mentioned, enables the set-top box to control different types of televisions. By way of example and not by way of limitation, the exemplary television 14 may include a motherboard 182 coupled to a control board 184, which is connected to each of a power board 186 and a converter 188. As shown, the power board is connected to the converter 188, which in turn is connected to a light bar 190. In one implementation, a television control interface 192 is connected to the motherboard 182. In one embodiment, the television control interface 192 may be a self-diagnosis interface. Further, the self-diagnosis interface may be selected from RJ25 ports, RS232 ports, RS422 ports, RS485 ports, multiple protocol interfaces (MPIs), and multiple television interfaces (MTIs), for example. As depicted, the television control interface 192 includes an RS232 standard DB-25 connection for the serial communication transmission of data. Such a connection formally defines the signals connecting between a DTE (data terminal equipment) such as a computer terminal, and a DCE (data circuit-terminating equipment, originally defined as data communication equipment. In this instance, the DTE and DCE refer to the television 14, which may be a commercial television, and the set-top box 12.

More specifically, in this example, the motherboard 182 receives a control signal to adjust the brightness and, in particular, dim the television via the television control interface 192 from the set-top box 12. The set-top box 12 utilizes the configuration profile 180 to format the control signal based on the type of television appropriate for television 14. Then, the control board 184 sends a television signal to the power board 186 and the light bar load, which is represented by the converter 188 and the light bar 190.

As shown, the converter 188 is coupled to an output end of the control board 184, and the control board 184 sends the television signal to the converter 188 when the control board 184 feeds back the television signal to the power board 186. The converter 188 adjusts the light bar 190 after the converter 188 receives the television signal sent by the control board 184, then the converter 188 feeds back an adjusted dimming signal to the power board 186. As the control board 184 is directly coupled to the power board 186, the control board 184 feeds back the television signal to the power board 186 when the control board 184 outputs the television signal. Thus, the power board 186 can receive the television signal sent by the control board 184 in advance, and adjust the output of the power board 186 in advance and an output voltage required by the light bar 190 without waiting to receive the dimming signal feedback by the converter 188 and then adjust the output of the power board 186 accordingly to ensure dimming of the television or, in another embodiment, brightening of the television. It should be appreciated that although a particular architecture of the television 14 is displayed and illustrated, other architectures and types of televisions are within the teachings presented herein.

Figure 6:
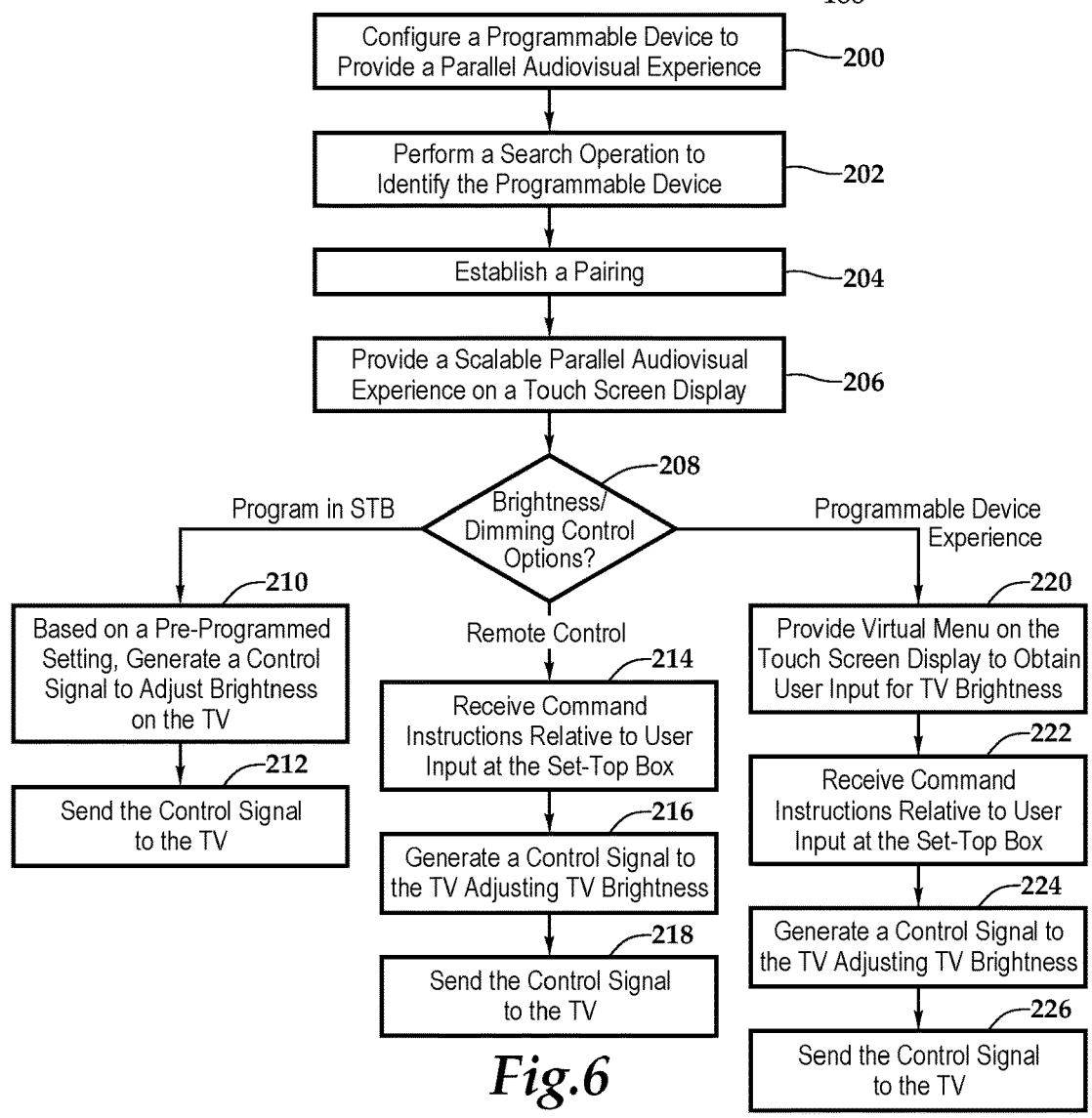
FIG. 6 is a flow chart depicting one embodiment of a method for providing a set-top box having enhanced content and control according to the teachings presented herein.

FIG. 6 depicts one embodiment of a method for providing a remote control device, according to the teachings presented herein, with the ability to adjust the brightness of a television. At block 200, the programmable device is configured to provide a parallel audiovisual experience. In one implementation, this may involve using an existing application on the programmable device, such as a browser, or downloading a new application. At block 202, a search, which may be active or passive, is performed by the set-top box to identify a physically proximate programmable device in the multi-room environment. At block 204, a pairing is established prior to a scalable parallel audiovisual experience being provided at block 206 on the touch screen display of the programmable device. In one implementation, the audiovisual experience is parallel to the television experience being provided by the set-top box. As noted by block 206, this experience may include providing virtual buttons integrated within the audiovisual experience or two or more panels within the touch screen display showing the television experience and one or more virtual remote controls. Further, the scalable parallel audiovisual experience may include providing content, including audio content or audiovisual content, from the programmable device to the set-top box and thereafter to the television.

Referring to decision block 208, as previously discussed, the brightness or dimness of the television may be adjusted by a program in the set-top box, by use of a remote control or as part of a programmable device experience. With respect to a program in the set-top box, at block 210, based on a pre-programmed setting, a control signal is generated to adjust the brightness on the television. The pre-programmed setting may be programmed to dim the television during the aforementioned "Sleep Mode," "Music Bluetooth," "or "Music Channel," by way of example, and then brighten the television during the completion of the aforementioned "Sleep Mode," "Music Bluetooth," "or "Music Channel," by way of example. At block 212, the control signal is sent to the television and then the brightness of the television is appropriately adjusted in accordance with the control signal.

With respect to the remote control, at block 214, a command may be received from remote control at the set-top box providing command instructions to adjust the brightness of the television. Thereafter, at blocks 216 then 218, an appropriate control signal is generated at the set-top box and the sent to the television. It should be appreciated that the dimming may be reduced to substantial darkness or the equivalent of OFF on the television. Further in another embodiment, the visual signal on the television may be turned OFF while the audio signal remains on.

Returning now to decision block 208 and, specifically, the importation of content from the proximate wireless-enabled interactive programmable device, at block 220, instructions are provided from the set-top box for virtual buttons on a touch screen display associated with the proximate wireless-enabled interactive programmable device. The virtual buttons are associated with the proximate wireless-enabled interactive programmable device and relate to obtaining user input for the programmable device experience functionality provided by the set-top box and, in this example, functionality relative to adjusting the brightness. At block 222, the set-top box receives command instructions from the proximate wireless-enabled interactive programmable device. Thereafter, at blocks 224 then 226, an appropriate control signal is generated at the set-top box and the sent to the television.

The order of execution or performance of the methods and data flows illustrated and described herein is not essential, unless otherwise specified. That is, elements of the methods and data flows may be performed in any order, unless otherwise specified, and that the methods may include more or less elements than those disclosed herein. For example, it is contemplated that executing or performing a particular element before, contemporaneously with, or after another element are all possible sequences of execution.

While this invention has been described with reference to illustrative embodiments, this description is not intended to be construed in a limiting sense. Various modifications and combinations of the illustrative embodiments as well as other embodiments of the invention, will be apparent to persons skilled in the art upon reference to the description. It is, therefore, intended that the appended claims encompass any such modifications or embodiments.

What is claimed is:

1. A set-top box comprising:
   a housing securing a television input, a television output, a processor, a memory, and a storage therein;
   a busing architecture communicatively interconnecting the television input, the television output, the processor, the memory, and the storage;

a wireless transceiver associated with the housing and coupled to the busing architecture, the wireless transceiver operable to communicate with a proximate wireless-enabled interactive programmable device, the proximate wireless-enabled interactive programmable device being a device selected from the group consisting of personal computers, laptops, tablet computers, smart phones, and smart watches;

the television input configured to receive a source signal from an external source;

the television output configured to forward a fully tuned signal to a television;

the memory accessible to the processor, the memory including processor-executable instructions that, when executed, cause the processor to:

establish a pairing between the proximate wireless-enabled interactive programmable device and the set-top box, receive and process virtual remote control functionality input instructions from the proximate wireless-enabled interactive programmable device relative to providing an audio source from the proximate wireless-enabled interactive programmable device, generate an audio input signal, provide the audio input signal to the television, generate a control signal that includes instructions to adjust a brightness of the television by dimming the television, and send the control signal to the television.

2. The set-top box as recited in claim 1, wherein the housing further comprises a housing-dongle combination securing the television input, the television output, the processor, the memory, the storage, and wireless transceiver therewith.

3. The set-top box as recited in claim 2, wherein the processor and the memory are distributed through the housing-dongle combination.

4. The set-top box as recited in claim 1, wherein the wireless transceiver is configured to communicate with the proximate wireless-enabled interactive programmable device via a standard selected from the group consisting of infrared (IR), 802.11, 3G, 4G, Edge, WiFi, ZigBee, near field communications (NFC), and Bluetooth.

5. The set-top box as recited in claim 1, wherein the wireless transceiver is configured to communicate with the proximate wireless-enabled interactive programmable device via a short distance data exchange standard.

6. The set-top box as recited in claim 5, wherein the short distance data exchange standard comprises Bluetooth.

7. The set-top box as recited in claim 1, wherein the transceiver is at least partially internal to the housing.

8. The set-top box as recited in claim 1, wherein the transceiver is at least partially external to the housing.

9. The set-top box as recited in claim 1, wherein the transceiver comprises an antenna.

10. The set-top box as recited in claim 1, wherein the control signal is provided to the television via a television control interface.

11. The set-top box as recited in claim 1, further comprising a configuration profile associated with the memory and processor-executable instructions that enables the set-top box to control a plurality of types of televisions.

12. A set-top box comprising:

a housing securing a television input, a television output, a processor, a memory, and a storage therein;

a busing architecture communicatively interconnecting the television input, the television output, the processor, the memory, and the storage;

a wireless transceiver associated with the housing and coupled to the busing architecture, the wireless transceiver operable to communicate with a proximate wireless-enabled interactive programmable device;

the television input configured to receive a source signal from an external source;

the television output configured to forward a fully tuned signal to a television;

the memory accessible to the processor, the memory including processor-executable instructions that, when executed, cause the processor to:

establish a pairing between the proximate wireless-enabled interactive programmable device and the set-top box, receive and process virtual remote control functionality input instructions from the proximate wireless-enabled interactive programmable device relative to providing an audio source from the proximate wireless-enabled interactive programmable device, generate an audio input signal, provide the audio input signal to the television, generate a control signal that includes instructions to adjust a brightness of the television by dimming the television, and send the control signal to the television.

13. A set-top box comprising:

a housing securing a television input, a television output, a processor, a memory, and a storage therein;

a busing architecture communicatively interconnecting the television input, the television output, the processor, the memory, and the storage;

a wireless transceiver associated with the housing and coupled to the busing architecture, the wireless transceiver operable to communicate with a proximate wireless-enabled interactive programmable device;

the television input configured to receive a source signal from an external source;

the television output configured to forward a fully tuned signal to a television;

the memory accessible to the processor, the memory including processor-executable instructions that, when executed, cause the processor to:

establish a pairing between the proximate wireless-enabled interactive programmable device and the set-top box, receive and process virtual remote control functionality input instructions from the proximate wireless-enabled interactive programmable device relative to adjusting a brightness of the television by dimming the television, generate an audio input signal, provide the audio input signal to the television, generate a control signal that includes instructions to adjust the brightness of the television relative to the remote control functionality input instructions by dimming the television, and send the control signal to the television.

14. The set-top box as recited in claim 13, wherein the memory further comprises processor-executable instructions that, when executed, cause the processor to:

receive and process virtual remote control functionality input instructions from the proximate wireless-enabled interactive programmable device relative to providing an audio source from the proximate wireless-enabled interactive programmable device.

* * * * *